No. 687,200. Patented Nov. 26, 1901.
G. V. A. CONGER.
POLE FOR TELEGRAPHS, &c.
(Application filed Nov. 14, 1900.)
(No Model.) 2 Sheets—Sheet 1.
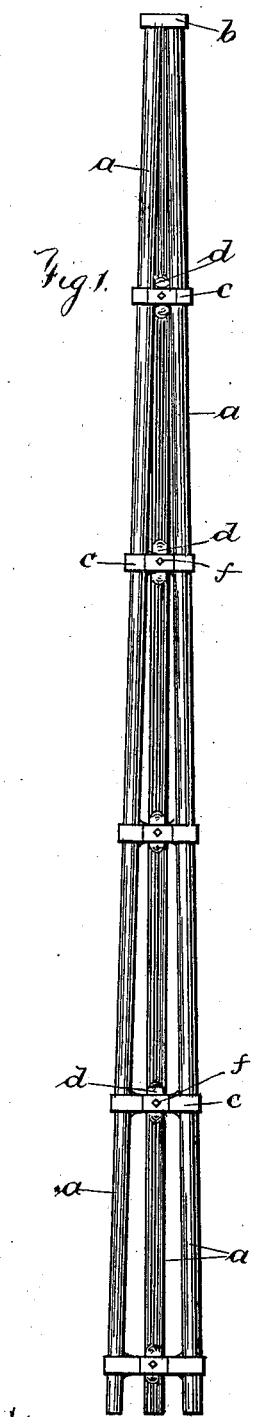
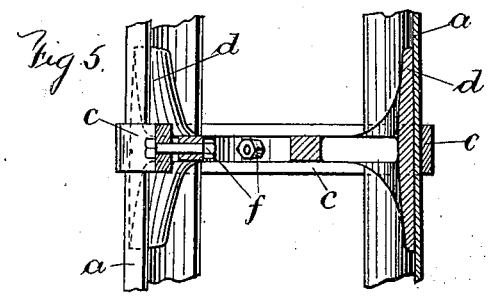
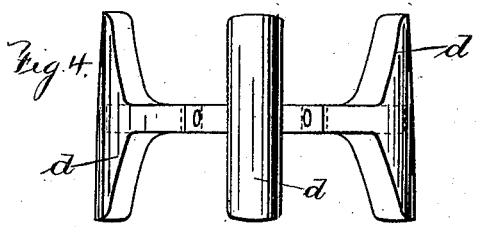
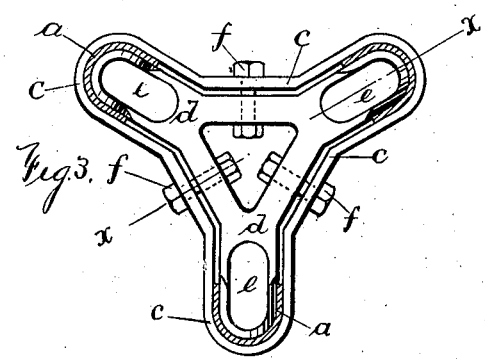
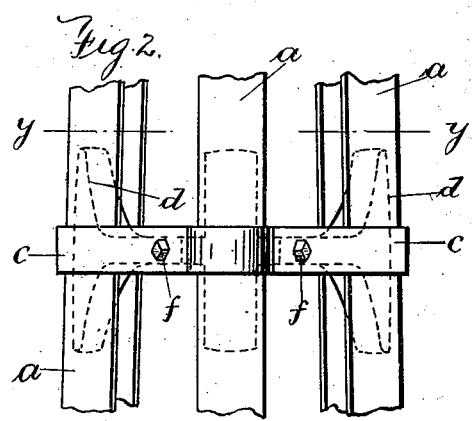
WITNESSES
INVENTOR No. 687,200. Patented Nov. 26, 1901.
G. V. A. CONGER.
POLE FOR TELEGRAPHS, &c.
(Application filed Nov. 14, 1900.)

(No Model.) 2 Sheets—Sheet 2.

UNITED STATES PATENT OFFICE.

GEORGE V. A. CONGER, OF BELLEVILLE, NEW JERSEY, ASSIGNOR TO THE ELECTRIC TRIPARTITE STEEL POLE COMPANY.

POLE FOR TELEGRAPHS, &c.

SPECIFICATION forming part of Letters Patent No. 687,200, dated November 26, 1901.

Application filed November 14, 1900. Serial No. 36,427. (No model.)

*To all whom it may concern:*

Be it known that I, GEORGE VAN A. CONGER, a citizen of the United States, residing at Belleville, in the county of Essex and State of New Jersey, have invented a new and useful Improvement in Poles for Telegraphs, &c., of which the following is a specification.

My invention relates to a metal pole of the knockdown form wherein the separate parts may be transported and the pole formed by assembling the parts at the place of use; and the object of my invention is to lighten the weight, increase the rigidity, reduce the cost, and at the same time maintain the durability of the pole. Furthermore, the construction is such that for certain uses I may dispense with a base and secure the pole directly in a concrete foundation.

In carrying out my invention I prefer to employ not less than three uprights or legs to each pole, and these are so placed as to cause the pole to taper from the base and largest end to the top and smallest end. The uprights are securely connected at the top by a cap or in any other suitable manner, and they are securely fastened together by spreaders and clamps of peculiar form at suitably-spaced-apart intervals, all of which will be hereinafter more particularly described.

Figure 7:
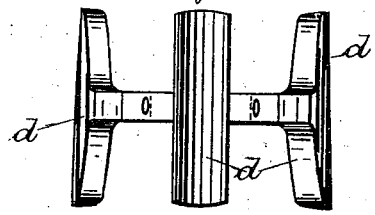
Figure 9:
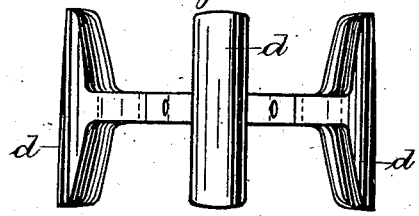
Figure 6:
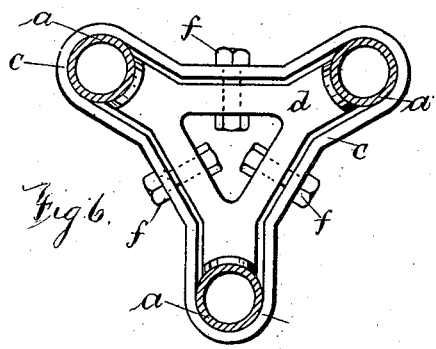
Figure 8:
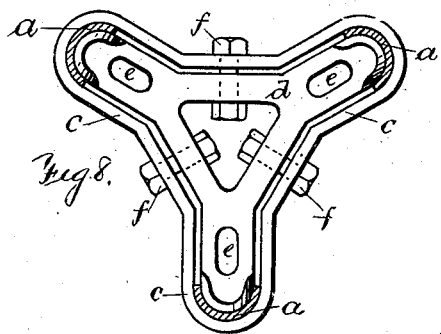
Figure 11:
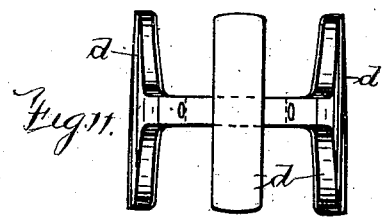
Figure 13:
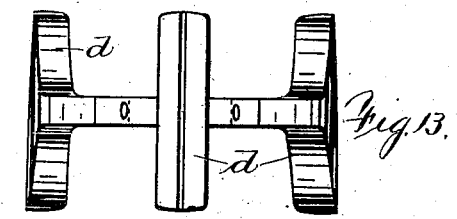
Figure 10:
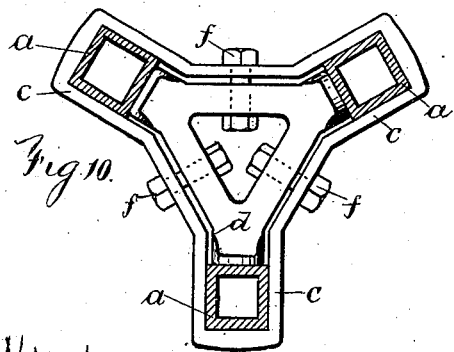
Figure 12:
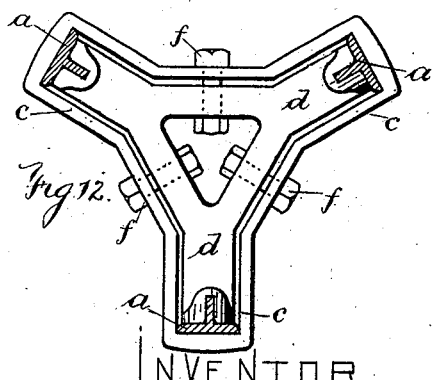

In the drawings, Figure 1 represents an elevation of an assembled pole. Fig. 2 is an elevation of a portion of the pole, showing the manner of assembling the uprights, spreader, and clamp. Fig. 3 is a sectional plan on line $y\ y$ of Fig. 2. Fig. 4 is an elevation of the spreader. Fig. 5 is a vertical section on the line $x\ x$, Fig. 3. Fig. 6 is a section through a pole, showing a modification wherein tubular uprights are used. Fig. 7 is an elevation of the spreader shown in Fig. 6. Fig. 8 is a sectional plan showing the application of a semicircular upright. Fig. 9 is an elevation of the spreader shown in Fig. 8. Fig. 10 is a sectional plan of a pole wherein hollow square uprights are employed. Fig. 11 is an elevation of the spreader shown in Fig. 10. Fig. 12 is a sectional plan through a pole in which the uprights are T-shaped. Fig. 13 is an elevation of the spreader shown in Fig. 12.

The principal features of my invention are the special construction of the spreaders and clamps and their connected relation.

The uprights $a$ may be of any cross-section desired, either U-shaped, as shown in Figs. 2 and 3, tubular, as shown in Fig. 6, semicircular, as in Fig. 8, square, as in Fig. 10, or T-shaped, as shown in Fig. 12.

The spreaders $d$ are made of cast metal, having radial arms set at angles of approximately one hundred and twenty degrees when three uprights are used. When a greater number of uprights are used, it is evident that the angle at which the arms radiate is equal approximately to the quotient of three hundred and sixty degrees and the number of uprights used. The arms of these spreaders terminate in flanges extending appreciably in opposite directions beyond the clamps or devices surrounding the uprights, and the faces of these flanges are made to conform to the inner faces of the uprights to be used with said spreaders. Where the U-shaped uprights, Figs. 2 and 3, are employed, these flange-faces are oval. When tubular uprights are used, Fig. 6, the flange-faces are concave. Where the semicircular uprights, Fig. 8, are used, the flange-faces are semicircular. With square uprights, Fig. 10, the flange-faces are flat, and when T-uprights are used the flange-faces are flat, with grooves to receive the tongue of the T, as shown in Fig. 12. The outer faces of the flanges are inclined to the imaginary axis of the pole to conform to the taper of the pole in lying flat against the uprights. These spreaders $d$ are made of different diameters in order that the poles may have the proper taper from the top to the base. In some forms of spreader I find it desirable to provide an opening behind the flanges, as at $e$, Fig. 3. This construction while not materially lessening the strength of the spreader does away with the probability of a pocket behind the flanges, said pocket being undesirable because of its forming a receptacle for water, dust, and the like.

The clamp members $c$ are bands of metal conforming in outline with the spreader members, but of sufficiently larger proportions to allow the uprights $a$ to be fitted between the spreaders $d$ and said clamps $c$. The spreader members are provided with bolt-holes placed centrally between the radiating arms. There are likewise corresponding bolt-holes in the clamp or binder members.

In assembling a pole according to my improved construction the uprights are placed in position and securely connected to the cap b, Fig. 1, in any desired manner, which, however, forms no part of my invention. The spreader members are then placed in position at spaced-apart intervals between the uprights and the clamp members placed over or outside the uprights in positions corresponding to those taken by the spreaders. Bolts f are passed through the bolt-holes of both the clamp and spreader members, as indicated in the drawings, and after the clamps and spreaders are in the correct positions the said bolts are drawn up tight.

With reference to Fig. 3 it will be seen that the portion of the clamp c through which the bolt is passed is made somewhat heavier than that portion which conforms to and passes around the upright. The object of this is to obviate a tendency of the parts through which the bolts pass to bend or spring, as would be the case if these parts were no heavier than the other parts. With this increased thickness a greater strain can safely be applied to the bolts, thus increasing the binding-grip on the uprights between the spreaders and the clamps.

In erecting a pole the foot may be set to the necessary depth in a bed of concrete, the concrete being placed in, around, and between the uprights and one or more of the pairs of spreaders and clamps and allowed to set.

It has been found from experiment that this construction of pole is very rigid and will stand strains of weight and lateral pull where other poles of well-known structure have failed.

I claim as my invention—

1. In a pole for telegraphs, &c., the combination with uprights and means for securely connecting the same at the upper end of the pole, of spreaders at spaced-apart intervals between and contacting with the inner faces of the uprights and devices extending around outside of the uprights for securely holding the spreaders and the uprights together, the spreaders each comprising several integral radiating arms and flanges at the ends thereof extending appreciably therefrom in opposite directions beyond the device surrounding the uprights and having outer faces bearing upon and conforming to the configuration of the uprights, substantially as specified.

2. In a pole for telegraphs, &c., the combination with uprights and means for securely connecting the same at the upper end of the pole, of spreaders at spaced-apart intervals between and contacting with the inner faces of the uprights and devices extending around outside of the uprights for securely holding the spreaders and the uprights together, the spreaders each comprising several integral radiating arms and flanges at the ends thereof extending appreciably therefrom in opposite directions and having inclined outer faces corresponding to the taper of the pole and which bear upon and conform to the configuration of the inner surface of the uprights, substantially as specified.

3. In a pole for telegraphs, &c., the combination with uprights or legs and means for securely connecting the same at the upper end of the pole, of spreaders at spaced-apart intervals within the uprights and means extending around the outside of the uprights for securely holding the spreaders and the uprights together, the spreaders each comprising several integral radiating arms having an open center and end flanges extending in opposite directions and having outer faces corresponding in configuration to the uprights to closely fit the same and openings through the arms back of the flanges, substantially as specified.

4. In a pole for telegraphs, &c., the combination with three concave uprights and means for securing the same together at their upper ends, of spreaders of different diameters, each having radial arms, and flanges which terminate said arms and are adapted to fit the concave sides of said uprights, clamps to fit over the uprights for the respective spreaders, and bolts to bind the clamps to the spreaders, whereby the uprights are held rigidly in position, said clamps being lighter in the portions where they bind the uprights than in the portions where they are bound to the spreaders by the bolts, substantially as and for the purposes set forth.

Signed by me this 8th day of November, 1900.

G. V. A. CONGER.

Witnesses:
GEO. T. PINCKNEY,
BERTHA M. ALLEN.